United States Patent
Gronau et al.

(10) Patent No.: US 6,238,020 B1
(45) Date of Patent: May 29, 2001

(54) METHOD AND BRAKE SYSTEM FOR CONTROL OF BRAKE PRESSURE BUILD-UP DURING A CONTROL PROCESS

(75) Inventors: Ralph Gronau, Wetter; Utz Lambert, Marburg; Gunther Buschmann, Idstein; Norbert Ehmer, Eschborn, all of (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/117,166

(22) PCT Filed: Jan. 16, 1997

(86) PCT No.: PCT/EP97/00180

§ 371 Date: Mar. 1, 1999

§ 102(e) Date: Mar. 1, 1999

(87) PCT Pub. No.: WO97/27090

PCT Pub. Date: Jul. 31, 1997

(30) Foreign Application Priority Data

Jan. 23, 1996 (DE) .............................................. 196 02 244

(51) Int. Cl.[7] .................................................. B60T 8/66
(52) U.S. Cl. .................................................. 303/158
(58) Field of Search ..................... 303/158, 157, 303/177, 174, 156, DIG. 3, DIG. 4, 166

(56) References Cited

U.S. PATENT DOCUMENTS

| | | | | |
|---|---|---|---|---|
| 4,054,328 | * | 10/1977 | Leiber et al. | 303/158 |
| 4,225,195 | * | 9/1980 | Weise et al. | 303/158 |
| 4,985,839 | * | 1/1991 | Dominke | 303/158 |

FOREIGN PATENT DOCUMENTS

| | | |
|---|---|---|
| 2205787 | 8/1973 | (DE) . |
| 2460904 | 7/1976 | (DE) . |
| 3522226 | 1/1987 | (DE) . |
| 3610185 | 10/1987 | (DE) . |
| 3810020 | 10/1989 | (DE) . |
| 3903180 | 8/1990 | (DE) . |
| 4101597 | 8/1991 | (DE) . |
| 443066 | 8/1991 | (DE) . |
| 177817 | 4/1986 | (EP) . |
| 371 932 | 6/1990 | (EP) . |
| WO87/05869 | 10/1987 | (WO) . |
| WO88/02709 | 4/1988 | (WO) . |

* cited by examiner

Primary Examiner—Douglas C. Butler
Assistant Examiner—Robert A. Siconolfi
(74) Attorney, Agent, or Firm—Rader, Fishman & Grauer PLLC

(57) ABSTRACT

The present invention discloses a method for use in automotive vehicles with an electronically controlled brake system (for example, ABS), wherein for controlling the braking pressure (re)increase during a control operation the rotational behavior of the individual wheels is measured and evaluated to determine braking pressure control signals, and wherein during a braking pressure control operation the braking pressure reduction in the previous cycle (26) is taken into account for the control of the braking pressure reincrease (27). According to the present invention, a braking pressure rise gradient (G) is calculated on the basis of the braking pressure increase in the preceding braking pressure increase phase (25), and the braking pressure increase or the variation of the braking pressure increase is calculated and predetermined on the basis of the rise gradient (G) and the calculated wheel cylinder pressure (P2) at the commencement of the current braking pressure increase phase (27) and on the basis of the current calculated locking pressure level (N3).

9 Claims, 2 Drawing Sheets

METHOD AND BRAKE SYSTEM FOR CONTROL OF BRAKE PRESSURE BUILD-UP DURING A CONTROL PROCESS

The present invention relates to a method which is intended for use in an automotive vehicle brake system with electronic braking pressure control and for controlling the braking pressure increase or braking pressure reincrease during a control operation, wherein the rotational behavior of the individual vehicle wheels is measured and evaluated to determine braking pressure control signals, and wherein during a braking pressure control operation the braking pressure reduction in the previous cycle is taken into account for the control of the braking pressure reincrease. Brake systems for implementing the above method are also comprised in the present invention. Braking pressure control operations of this type occur especially during anti-lock control operations, but also in the event of driving stability control operations, and like control operations.

Brake systems with electronic anti-lock control (ABS) are known in the art and on the market in various designs. In customary systems, the rotational behavior of the individual vehicle wheels is known to be measured by means of wheel rotational speed sensors, wheel sensors in short, and evaluated as the only or the most important input quantity of the braking pressure control system. In order to achieve a satisfactory control which ensures maintaining steerability and driving stability despite very different road conditions and driving situations, the vehicle requiring only a short stopping distance due to the control, a very sophisticated control philosophy is necessary which can only be achieved by complex calculating algorithms.

The braking pressure increase or reincrease after a previous braking pressure reduction which was initiated by the control presents a special rating problem to the control philosophy. A basic objective is that the braking pressure approaches the locking pressure level very quickly and with great precision so that the wheel runs stable and is effectively braked simultaneously. The control frequency, i.e., the decrease and reincrease of the pressure during an anti-lock control operation, is desired to be as low as possible for physical and comfort reasons.

German patent application No. 39 03 180 A1 (P 6632) discloses a circuit arrangement for a brake system with anti-lock control wherein for pressure reincrease after pressure reduction which was triggered by the control, the braking pressure is introduced in to the wheel brake with a steep and subsequently with a flatter gradient. This pressure introduction is achieved by a variable pulse and short invariable pulses which are successive at long intervals. The proportioning of the pressure reincrease depends on the duration of the pressure increase during the steep rise phase in the previous cycle, the duration of the entire pressure increase in the previous cycle, and the duration of the previous pressure reduction.

An object of the present invention is to develop a method which permits adjusting a precisely controlled pressure reincrease conformed to the respective situation, after a preceding pressure reduction which was triggered by the control. The pressure level of the controlled wheel, which run s stable again and is underbraked after the previous pressure reduction, s hall be raised to the locking pressure level as quickly as possible. Also, in order to keep the control frequency low, the introduction of an excessively high braking pressure shall be avoided, and the locking pressure level shall not be exceeded again instantaneously. An additional requirement is an adaption to the constant variations of the control quantities or influencing variables as quickly and precisely as possible.

It has been found that this object can be achieved by the method described in claim 1. The special features of the method of the type initially referred to involve that a braking pressure rise gradient is calculated on the basis of the braking pressure increase in the previous braking pressure increase phase, that the braking pressure increase and variation of the braking pressure increase is calculated and predetermined on the basis of this braking pressure rise gradient and the wheel cylinder pressure at the commencement of the current braking pressure increase phase and on the basis of the current locking pressure level.

Some particularly advantageous embodiments of the method of the present invention and brake systems for implementing the method are described in the subclaims.

Thus, according to the present invention, the braking pressure rise gradient in the previous increase phase is made the basis for determining or dimensioning the braking pressure reincrease during a control operation. The starting point of the braking pressure reincrease is the current wheel cylinder pressure which is determined from the directly preceding braking pressure reduction phase. The braking pressure increase is continued until the locking pressure level is reached again. A variation of the locking pressure level which has meanwhile occurred is immediately taken into account for the proportioning of the braking pressure increase.

The braking pressure rise gradient in a braking pressure increase phase depends on the pilot pressure or master cylinder pressure and, thus, on the force by which the driver applies the brake. According to the present invention, the data about the pilot pressure is taken into account for the calculation of the braking pressure reincrease.

This way, the pilot pressure which respectively prevailed in the cycle that directly preceded or the directly preceding braking pressure increase phase is made the basis for the calculation of the current braking pressure increase.

Further details of the present invention can be taken from the following description of an embodiment making reference to the accompanying drawings.

Figure 1:
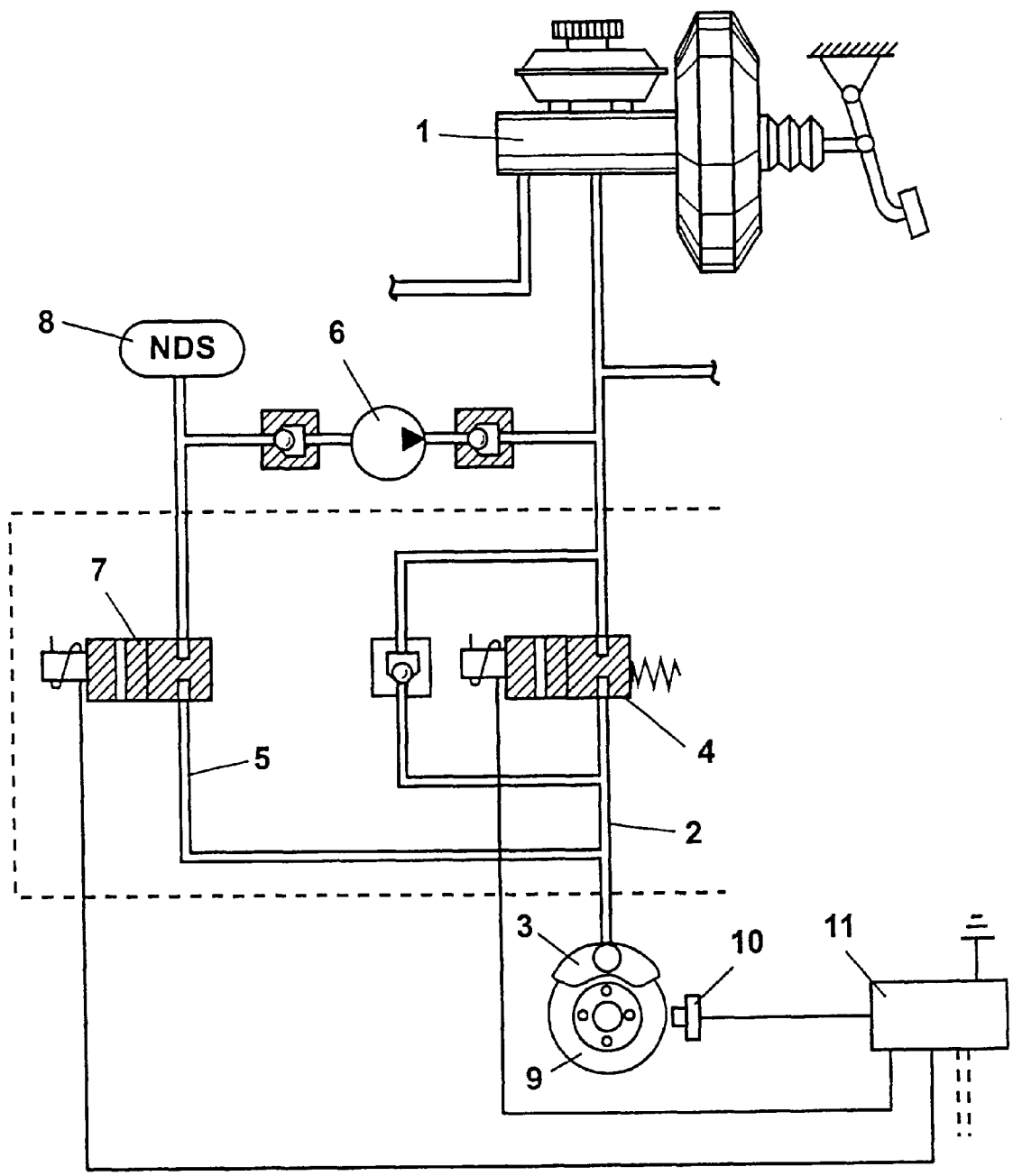
FIG. 1 is a schematically simplified view of the essential components of an automotive vehicle brake system on which the method of the present invention is expediently implemented.

Reference numeral 1 in the FIG. 1 embodiment designates a pedal-actuated master cylinder which is connected to a wheel brake 3 by way of a brake line 2. Inserted into brake line 2 is an inlet valve 4 which is electromagnetically operated and switched to the open condition in its initial or inactive position. As soon as valve 4 is actuated, it switches into a condition where the brake line 2 is closed. Extending in parallel to brake line 2 is a return line 5 which connects the wheel brake 3 to the master cylinder 1. A hydraulic pump 6 is inserted into this line, and the wheel brake 3 is hydraulically connected to the suction side of the pump 6 by way of an outlet valve 7.

The outlet valve 7 is also actuated electromagnetically. In the initial or inactive position, the outlet valve 7 is closed. Actuation of the valve 7 opens a return line from the wheel brake 3 to the hydraulic pump 6.

A low-pressure accumulator 8 is connected to the suction side of the pump 6 and takes up the pressure fluid, which discharged from wheel brake 3 for pressure fluid reduction, for a short time.

The rotational behavior of wheel 9 which is braked by the wheel brake 3 is measured by means of a wheel sensor 10. An electronic evaluating circuit 11 ascertains the signals of the wheel sensor 10 and the signals of the other wheel sensors (not shown) of the other vehicle wheels, evaluates the signals and finally produces braking pressure control signals to actuate the inlet and outlet valves 4 and 7, respectively.

The brake system shown in the embodiment is a so-called closed-loop system. Of course, the method of the present invention is equally appropriate for hydraulic open-center systems and for controlled brake systems of a completely different configuration.

The special features of the present invention show in the evaluation of the sensor signals and in the calculation of the braking pressure increase by means of the evaluating circuit 11. Evaluation circuits of this type are nowadays realized preferably on a digital basis using programmed circuits, especially microcomputers or microcontrollers.

Figure 2:
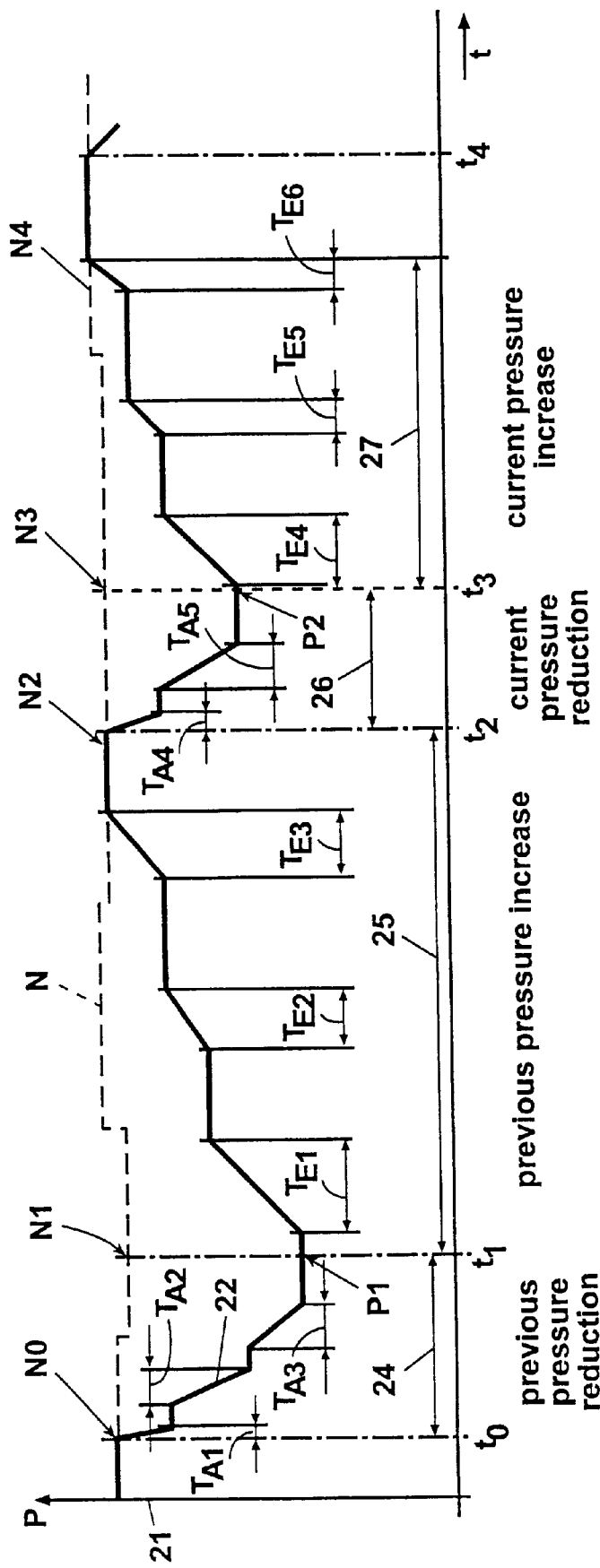
FIG. 2 is an idealized view of the variation of the braking pressure in the wheel cylinder of a controlled wheel during an anti-lock control operation when the method of the present invention is implemented.

The FIG. 2 embodiment shows a short section of the braking pressure variation in the wheel brake of a controlled wheel, for example, in the wheel brake 3 of the brake system of FIG. 1. There is shown the typical variation of the braking pressure p in the wheel brake during a braking pressure control cycle. In general, several pressure fluctuations or control cycles of the type illustrated above occur during a control operation.

The locking pressure level N for the vehicle wheel at topic is represented in a dotted line. In a system of the type illustrated, the locking pressure level N is calculated on the basis of the wheel deceleration and/or vehicle deceleration, and the appropriate values providing the most useful data are derived and calculated in a known fashion by logically combining the deceleration signals, and/or from the vehicle reference speed.

N represents the decisive, continuously updated locking pressure level for the wheel at issue. In the section of a control operation shown, a braking pressure reduction triggered by the control commences at the time $t_0$ when the braking pressure or the locking pressure level N0 prevails in the wheel concerned. Within a period 24, the pressure in the wheel cylinder is reduced to a pressure P1 starting from the locking pressure or locking pressure level N0. In the FIG. 2 embodiment, this is done within the period 24 and caused by three pressure reduction pulses $T_{A1}$, $T_{A2}$, $T_{A3}$ which are separated by pulse pauses (characterized by the horizontal pressure variation). Thus, the pressure reduction time is composed of the period 24, reduced by the pulse pauses (horizontal areas of the pressure variation).

The locking pressure N0 is calculated from the wheel or vehicle deceleration. The braking pressure reduction characteristic curve of the system is known because pressure reduction is always effected in relation to a defined counter pressure. Consequently, the braking pressure P1 which prevails at the end of the reduction phase can be determined on the basis of the pressure reduction times $T_{A1}+T_{A2}+T_{A3}$.

Pressure reincrease occurs in a period 25 until the locking pressure level N2 is reached. The inlet valve opening times or actuation times which are required to increase the pressure from the level P1 to the locking pressure level N2 are referred to by $T_{E1}$, $T_{E2}$, $T_{E3}$ in the FIG. 2 embodiment. Consequently, the braking pressure rise gradient G may be determined from the pressure difference N2-P1 divided by the sum of the inlet valve acutation times $T_{E1}, T_{E2}, T_{E3}$.

Upon termination of the first control cycle, the wheel under review becomes unstable again so that the wheel cylinder pressure is reduced again at time $t_2$. The pressure P2 can be calculated as explained hereinabove from the locking pressure level N2 at the commencement of the pressure reduction and the valve actuation times $T_{A4}+T_{A5}$ in consideration of the braking pressure reduction characteristics of the system.

All data for calculating the current pressure increase in the current increase phase 27 is now available. Starting from the wheel cylinder pressure P2 at the time $t_3$, on the basis of the pressure rise gradient G of the previous pressure increase phase which results from the quotient $$G=(N2-P1)/(T_{E1}+T_{E2}+T_{E3}),$$

the inlet valve opening times $T_{E4}+T_{E5}+T_{E6}$ are now determined in this current pressure increase phase. However, $T_{E6}$ can be varied as a function of the current locking pressure level N3, N4.

The total opening time $T_{E4}+T_{E5}+T_{E6}$ of the inlet valve in the pressure increase phase, apart from the adaption to the locking pressure level N4 which was determined the last, is calculated from the directly preceding pressure reduction 26 and the pressure rise gradient G in the previous cycle 25. The relation $$T_{Etotal}=T_{E4}+T_{E5}+T_{E6}=(N_3-P_2)/G$$

applies. The division into an initial pulse ($T_{E4}$) which approximately covers half the total valve actuation time and the other, shorter intervals or pulses $T_{E3}, T_{E6}$ is performed according to a predetermined pattern in the present embodiment of the invention. Premature occurrence of a new locking tendency of the controlled wheel is avoided (without underbraking the wheel) by a 'cautious' introduction of pressure in the range of the locking pressure level.

A new control cycle commences at time t4 in the embodiment shown.

Thus, the decisive quantities for proportioning the pressure reincrease are derived from the respectively most current data according to the method of the present invention. The pressure reduction which directly preceded and the previously performed pressure increase are evaluated. What is initially of major importance is the locking pressure level N3 at the time of the pressure increase calculation. However, as in the FIG. 2 embodiment, a subsequent, significant change in the locking pressure level (to the value N4) can be taken into account by one or more additional short increase pulses. When the change in the locking pressure level exceeds a certain, predetermined limit value (for example, in excess of 20%), the total valve actuation time calculated at time $t_3$ (FIG. 2) will be corrected accordingly and, thus, the pressure increase is conformed to the current conditions.

What is claimed is:

1. Method for use in an automotive vehicle brake system with electronic braking pressure control, for controlling the braking pressure increase during a controlled braking operation, wherein the rotational behavior of the individual vehicle wheels is measured and evaluated to determine braking pressure control signals, and wherein during a braking pressure control operation the braking pressure reduction in the previous cycle is taken into account for the control of the braking pressure increase or reincrease, comprising the step of:

calculating a braking pressure rise gradient on the basis of the braking pressure increase in the previous braking pressure increase phase, in that the braking pressure increase and the variation of the braking pressure increase is calculated and predetermined on the basis of the braking pressure rise gradient, the wheel cylinder pressure at the commencement of the current braking pressure increase phase, and on the basis of the current locking pressure level.

2. Method as claimed in claim 1, further including the step of determining the wheel cylinder pressure at the commencement of the current braking pressure increase phase from the locking pressure level and the braking pressure reduction, and the measured values of the braking pressure reduction phase which directly preceded are made the basis for this determining operation.

3. Method as claimed in claim 2, further including the sub-step of:

determining the braking pressure reduction, the actuation times of the braking pressure reduction valves with respect to locking pressure level or the wheel braking pressure at the commencement of the reduction phase and in consideration of the braking pressure reduction characteristic curve of the system.

4. Method as claimed in claim, 1, wherein the locking pressure level is calculated from the wheel deceleration and/or the vehicle deceleration at the commencement of braking pressure control or braking pressure reduction.

5. Method as claimed in claim 1, wherein the current braking pressure increase is performed according to a predetermined braking pressure increase pattern.

6. Method as claimed in claim 5, wherein braking pressure increase is triggered by actuating an inlet valve, and the calculated total opening time of the inlet valve is divided according to the predetermined braking pressure increase pattern.

7. Method as claimed in claim 6, wherein the total opening time of the inlet valve is subdivided into a first braking pressure increase time, which corresponds approximately to half the entire opening time and further braking pressure increase periods of approximately equal duration which are interrupted by pauses of approximately equal length.

8. Brake system with electronic braking pressure control which includes wheel sensors for determining the rotational behavior of the individual wheels and an electronic evaluating circuit for evaluating the sensor signals and for generating braking pressure control signals, a master cylinder and wheel brakes which are connected by way of brake lines into which electrically operable braking pressure control valves are inserted, wherein inlet valves are used to control the pressure fluid flow to the wheel brakes and, thus, the pressure increase, and outlet valves are used to control the pressure reduction, comprising:

means to calculate the wheel deceleration and the vehicle deceleration on the basis of the wheel sensor signals, wherein, the current locking pressure level is calculated from the current wheel and/or vehicle deceleration, and wherein the current wheel braking pressure is calculated from the total time of the outlet valve actuation times of a wheel during a braking pressure reduction period in consideration of the current locking pressure level and the braking pressure reduction characteristic curve of the system, and means for calculating the braking pressure rise gradient from the total of the inlet valve actuation times during a braking pressure increase phase in consideration of the wheel cylinder pressure at the commencement of the increase phase and the current locking pressure level.

9. Brake system as claimed in claim 8, further including means for evaluating the braking pressure rise gradient of the preceding braking pressure increase phase to calculate the current braking pressure reincrease.

* * * * *